(12) United States Patent
Bhageria et al.

(10) Patent No.: US 11,893,543 B2
(45) Date of Patent: Feb. 6, 2024

(54) OPTIMIZED AUTOMATIC CONSENSUS DETERMINATION FOR EVENTS

(71) Applicant: INTERNATIONAL BUSINESS MACHINES CORPORATION, Armonk, NY (US)

(72) Inventors: Gopal Bhageria, Kolkata (IN); Ramasuri Narayanam, Guntur (IN); Srikanth G. Tamilselvam, Chennai (IN); Radha Bellamkonda, Telangana (IN)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/980,155

(22) Filed: May 15, 2018

(65) Prior Publication Data
US 2019/0354937 A1    Nov. 21, 2019

(51) Int. Cl.
*G06Q 10/1093* (2023.01)
*G06N 20/00* (2019.01)

(52) U.S. Cl.
CPC ......... *G06Q 10/1095* (2013.01); *G06N 20/00* (2019.01)

(58) Field of Classification Search
CPC ........... G06Q 10/1095; G06Q 10/0631; G06Q 10/101; G06Q 30/02; G06Q 30/0201;
(Continued)

(56) References Cited

U.S. PATENT DOCUMENTS 7,617,160 B1 * 11/2009 Grove .................... G06Q 10/10
                                                              705/500
10,102,546 B2 * 10/2018 Heath ................ G06Q 30/0259
(Continued)

FOREIGN PATENT DOCUMENTS

EP         1209599 A2 *  5/2002  ............. G06Q 30/02
WO   WO-2006050245 A2 *  5/2006  ............. G06Q 10/04
(Continued)

OTHER PUBLICATIONS

Digital footprint. (May 14, 2018). In Wikipedia. Retrieved from https://en.wikipedia.org/w/index.php?title=Digital_footprint&oldid=841195260 on May 14, 221. (Year: 2018).*
(Continued)

*Primary Examiner* — Mehmet Yesildag
*Assistant Examiner* — Thomas Yih Ho
(74) *Attorney, Agent, or Firm* — Nicholas Welling, Esq.; Rachel L. Pearlman, Esq.; Heslin Rothenberg Farley & Mesiti PC

(57) ABSTRACT

A method, computer program product, and a system where a processor(s) generates a digital wardrobe for each user of a set of users. The processor(s) obtains a prospective theme(s) for a given event and a list of participants comprising a portion of the set of users. The processor(s) identify preferences, in the digital wardrobes of the portion of the set of users, relevant to each of the one or more prospective themes for the given event. The processor(s) determine, based on analyzing the relevant preferences in the digital wardrobes of the portion of the set of users, if a consensus exists in the relevant preferences of the portion of the set of users, where the consensus represents a given prospective theme, where the respective relevant preferences for the given prospective theme are aligned across the portion of the set of users. Based on determining that the consensus exists, the processor(s) generates an event theme for the given event, wherein the event theme is the consensus.

10 Claims, 8 Drawing Sheets

(58) Field of Classification Search
CPC .......... G06Q 30/0202; G06Q 30/0204; G06Q 30/0205; G06Q 30/0251; G06Q 30/0252; G06Q 30/0254; G06Q 30/0255; G06Q 30/0269; G06Q 50/01; G06Q 10/02; G06Q 30/0271; H04L 67/306; G06N 20/00

See application file for complete search history.

(56) References Cited

U.S. PATENT DOCUMENTS

| | | | |
|---|---|---|---|
| 11,443,215 B2* | 9/2022 | Bettencourt-Silva | G06N 5/04 |
| 2004/0210661 A1* | 10/2004 | Thompson | H04L 67/306 709/228 |
| 2008/0147484 A1* | 6/2008 | Davis | G06Q 30/02 705/14.42 |
| 2008/0201361 A1* | 8/2008 | Castro | G06Q 30/02 |
| 2012/0136689 A1 | 5/2012 | Ickman et al. | |
| 2012/0316916 A1* | 12/2012 | Andrews | G06Q 50/01 705/7.29 |
| 2013/0013550 A1* | 1/2013 | Kerby | G06Q 10/10 706/52 |
| 2013/0086079 A1* | 4/2013 | Chaudhuri | G06Q 50/01 707/748 |
| 2013/0218687 A1* | 8/2013 | Sohangir | G06Q 50/01 705/14.66 |
| 2013/0246526 A1 | 9/2013 | Wu et al. | |
| 2014/0032259 A1* | 1/2014 | LaFever | G06Q 30/0271 705/7.29 |
| 2014/0114998 A1* | 4/2014 | Kadam | G06Q 10/10 707/758 |
| 2014/0278676 A1 | 9/2014 | Burka | |
| 2014/0344324 A1* | 11/2014 | Chun | G06F 3/0481 709/202 |
| 2015/0019523 A1* | 1/2015 | Lior | G06Q 10/109 707/708 |
| 2015/0026084 A1 | 1/2015 | Guo et al. | |
| 2015/0161538 A1* | 6/2015 | Matus | G06Q 40/08 705/4 |
| 2015/0193889 A1* | 7/2015 | Garg | G06Q 30/0251 705/14.49 |
| 2016/0092557 A1* | 3/2016 | Stojanovic | G06Q 30/02 707/723 |
| 2016/0103822 A1* | 4/2016 | George | G06F 16/24522 704/9 |
| 2016/0364490 A1* | 12/2016 | Maugans, III | G06F 16/9535 |
| 2017/0004439 A1* | 1/2017 | Bostick | G06F 40/30 |
| 2017/0109854 A1* | 4/2017 | Birdsong | G06F 21/6218 |
| 2017/0140285 A1* | 5/2017 | Dotan-Cohen | H04W 4/02 |
| 2017/0180497 A1* | 6/2017 | Comstock | H04L 67/42 |
| 2017/0236081 A1* | 8/2017 | Grady Smith | G06Q 10/067 705/7.36 |
| 2017/0236524 A1* | 8/2017 | Ray | H04L 51/10 709/224 |
| 2017/0352070 A1* | 12/2017 | DeLuca | G06F 18/41 |
| 2018/0053114 A1* | 2/2018 | Adjaoute | G06N 3/126 |
| 2018/0336575 A1* | 11/2018 | Hwang | G06Q 30/0201 |
| 2019/0019233 A1* | 1/2019 | Bhowmick | H04L 67/306 |
| 2019/0163741 A1* | 5/2019 | Buckwalter | G06F 16/906 |
| 2020/0090284 A1* | 3/2020 | Anders | G06N 7/01 |

FOREIGN PATENT DOCUMENTS

| | | | | |
|---|---|---|---|---|
| WO | WO-2008121872 A1 * | 10/2008 | ....... | G06F 17/30522 |
| WO | WO-2013158108 A1 * | 10/2013 | ....... | G06F 17/30699 |
| WO | 2015160462 A1 | 10/2015 | | |

OTHER PUBLICATIONS

Minkov, Einat, et al. "Collaborative future event recommendation." Proceedings of the 19th ACM international conference on Information and knowledge management. 2010. (Year: 2010).*

Mell et al., "The NIST Definition of Cloud Computing", National Institute of Standards and Technology, U.S. Dept. of Commerce, NIST Special Publ. 800-145, Sep. 2011, 7 pages.

"Theme Parties", [retrieved on May 15, 2018]. Retrieved from the Internet URL: <http://www.icsiindia.in/sectors/theme-parties.html>, International Chamber for Service Industry, 2015, 2 pgs.

Rane, R., "The Rise and Rise of Events Industry in India", [retrieved on May 15, 2018]. Retrieved from the Internet URL: <https://blog.megavenues.com/the-rise-and-rise-of-events-industry-in-india-events-industry-statistics-in-India-5353572a103e#.kovdtr3ct>, Oct. 15, 2015, 6 pgs.

Coleman, Al, "Children's parties: a winning formula for entrepreneurs", [retrieved on May 15, 2018]. Retrieved from the Internet URL: <https://www.theguardian.com/small-business-network/2014/aug/19/childrens-parties-entrepreneurs>, Aug. 19, 2014, 4 pgs.

Satenstein, L., "10 Stylish Ways to Dress for a Theme Party With Next to No Effort", [retrieved on May 15, 2018]. Retrieved from the Internet URL: <http://www.vogue.com/article/how-to-dress-for-a-theme-party>, Aug. 8, 2014, 6 pgs.

"If You Can Dream It, We Can Theme It!", [retrieved on May 15, 2018]. Retrieved from the Internet URL: <http://themers.com/>, 3 pgs.

Bob Gail—Themed Events—[retrieved on May 15, 2018]. Retrieved from the Internet URL: <http://www.bobgail.com/event-themes.html>, 8 pgs.

Julia Charles—Event Management—[retrieved on May 15, 2018]. Retrieved from the Internet URL: <http://www.juliacharleseventmanagement.co.uk/content/themedsets>, 8 pgs.

Theme Traders—Creative Event Production—[retrieved on May 15/2018]. Retrieved from the Internet URL: <http://www.themetraders.com/event-planning-events>, 2 pgs.

* cited by examiner

OPTIMIZED AUTOMATIC CONSENSUS DETERMINATION FOR EVENTS

BACKGROUND

A common requirement for events is presently, a theme. Themes are designed for, and applied to, events, including but not limited to, birthday parties, reunions, weddings, and various other milestones events. Presently, determining what theme would be appropriate and well-received at a given event, contributing to the success of the event, can be a complex undertaking and involves a lot of guesswork, and many times, is handled by a paid event coordinator. Event management is a thriving industry worldwide and much of the event planning is devoted to determining a theme. When determining the theme, the organizer may consider various aspects, beyond the preferences of the host, such as current trends, things that inspire the host, favorite activities or hobbies of the host, and whether the theme will be unique, given other events that are known to the coordinator. The resultant theme, as created and implemented by the coordinator, will hopefully be well-received by the host and/or whomever is funding the event, but may not be the best-suited theme for the attendees. Many professionals in the event planning industry hold that the success of many events, whether it is a charity event or a personal celebration, can be forecast by the creativity of the theme. A positive response to a theme can create a successful event.

SUMMARY

Shortcomings of the prior art are overcome and additional advantages are provided through the provision of a method for determining a relevant commonality among the digital wardrobes of users for a specific application. The method includes, for instance: generating, by the one or more processors, a digital wardrobe for each user of a set of users, the generating comprising, for each user: monitoring, by the one or more processors, user activity on one or more computing nodes to identify structured and unstructured data sources storing data related to the user, wherein the activity on the one or more computing nodes comprises connecting to the structured and unstructured data sources and to identify the one or more computing nodes utilized by the user; machine learning, by the one or more processors, attributes of the user, based on ingesting structured data and unstructured data from the data sources and the identity of the one or more computing nodes utilized by the user; and determining, by the one or more processors, that a portion of the attributes represent preferences relevant to particular event themes; obtaining, by the one or more processors, one or more prospective themes for a given event and a list of participants comprising a portion of the set of users; identifying, by the one or more processors, one or more preferences, in the digital wardrobes of the portion of the set of users, relevant to each of the one or more prospective themes for the given event; determining, by the one or more processors, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, wherein the respective one or more relevant preferences for the given prospective theme are aligned across the portion of the set of users; and based on determining that the consensus exists, generating, by the one or more processors, an event theme for the given event, wherein the event theme is the consensus.

Shortcomings of the prior art are overcome and additional advantages are provided through the provision of a computer program product for determining a commonality in the digital wardrobes of users for a specific application. The computer program product comprises a storage medium readable by a processing circuit and storing instructions for execution by the processing circuit for performing a method. The method includes, for instance: generating, by the one or more processors, a digital wardrobe for each user of a set of users, the generating comprising, for each user: monitoring, by the one or more processors, user activity on one or more computing nodes to identify structured and unstructured data sources storing data related to the user, wherein the activity on the one or more computing nodes comprises connecting to the structured and unstructured data sources and to identify the one or more computing nodes utilized by the user; machine learning, by the one or more processors, attributes of the user, based on ingesting structured data and unstructured data from the data sources and the identity of the one or more computing nodes utilized by the user; and determining, by the one or more processors, that a portion of the attributes represent preferences relevant to particular event themes; obtaining, by the one or more processors, one or more prospective themes for a given event and a list of participants comprising a portion of the set of users; identifying, by the one or more processors, one or more preferences, in the digital wardrobes of the portion of the set of users, relevant to each of the one or more prospective themes for the given event; determining, by the one or more processors, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, wherein the respective one or more relevant preferences for the given prospective theme are aligned across the portion of the set of users; and based on determining that the consensus exists, generating, by the one or more processors, an event theme for the given event, wherein the event theme is the consensus.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
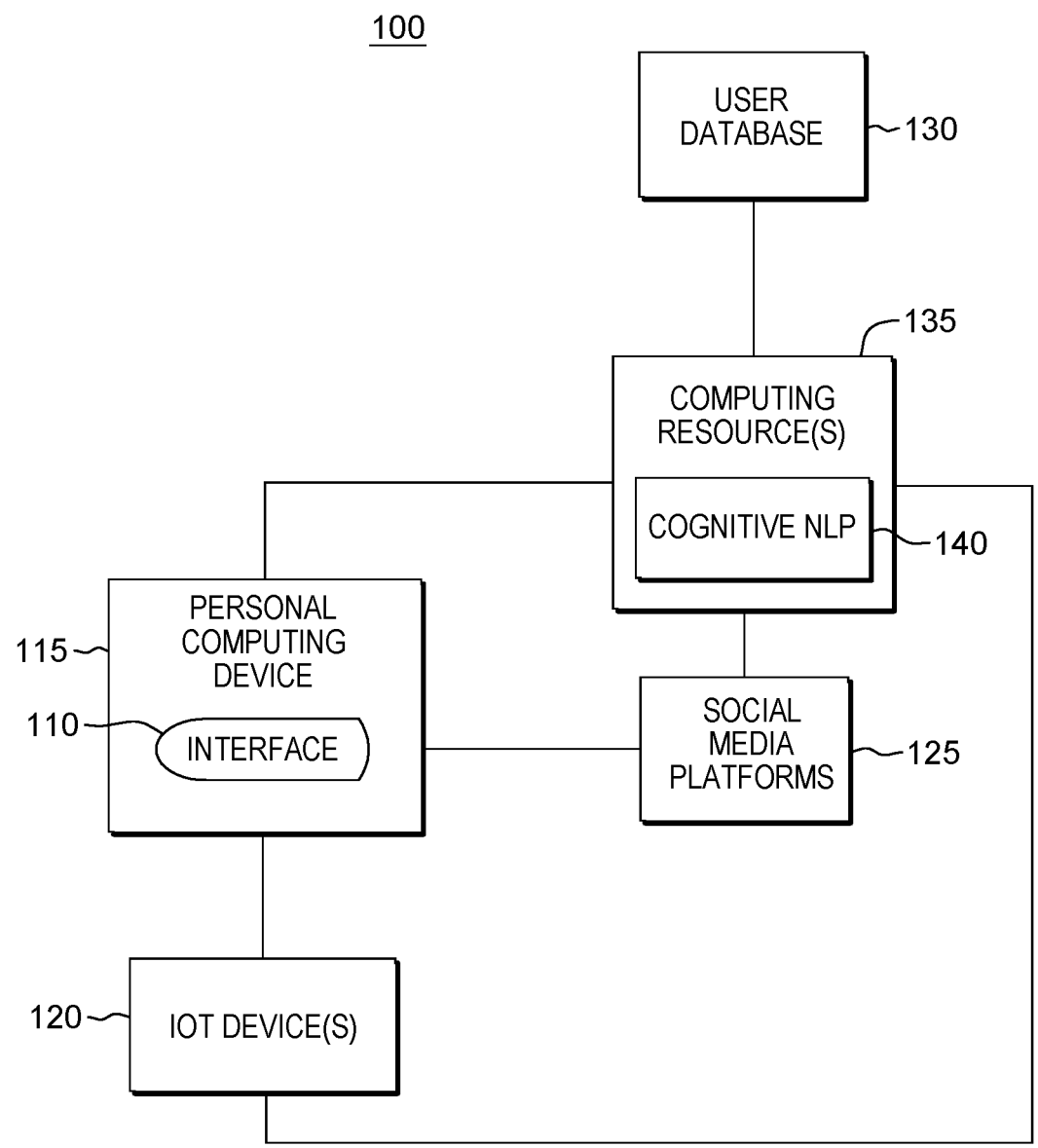
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
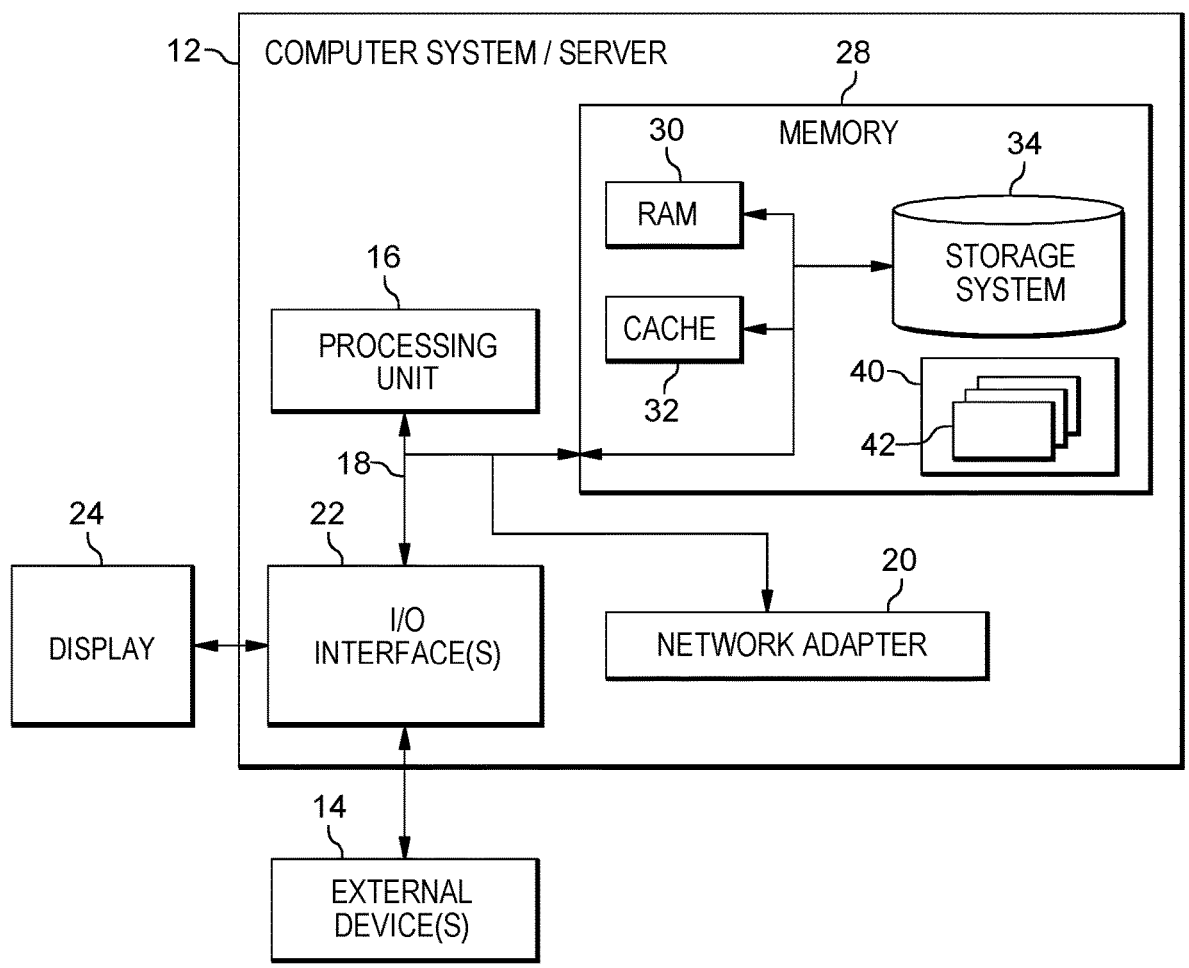
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computer system that include program code executed on at least one processing circuit that automatically generates a theme for an event, based on digital wardrobes of the participants. In generating the theme, the program code utilizes the digital wardrobes of the participants in concert with enabling communications between the participants, to create a consensus among the participants, regarding the theme. Although the consensus building methods disclosed herein are applied in an event planning context, individuals of skill in the art will recognize that various aspects of embodiments of the present invention can be utilized to solve additional challenges resolved by a consensus value, when program code utilizes digital wardrobes of individuals to extract attributes that inform this consensus. Some other example in which aspects of embodiments of the present invention can be utilized include, but are not limited to, utilizing digital wardrobes in decisions regarding the acquisition of resources for a given group, utilizing a digital wardrobes to schedule events for a given group of people, utilizing digital wardrobes to select vendors for various products for given populations, etc.

As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, Internet of Things devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual. In addition to identifying a user, data that comprises a digital wardrobe can be utilized to tailor additional applications, software, events, experiences, to fit the parameters and preferences to the user, based on extracting and analyzing this data from the user's digital wardrobe.

The software and hardware sources for a digital wardrobe are vast (improving the accuracy of the digital wardrobe) due to the interconnectivity of various devices and the ease of connectivity of the individuals to those devices. For example, the data available from IoT devices alone can provide considerable data that can shape the digital wardrobe of an individual. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device 115, FIG. 1) can identify the source of the information. Within the IoT, various devices can communicate with each other and can access data from sources available over various communication networks, including the Internet.

In some embodiments of the present invention, program code executing on a processing resource automatically generates a theme for an event, based on digital wardrobes of the participants, as well as other temporal data indicative of trends. In embodiments of the present invention, program code executing on at least one processor determines a theme for an event based on facilitating a consensus (theme) among event participants, utilizing the digital wardrobes of the participants, and, optionally, other temporal and/or environmental factors. The program code comprises a multi-agent collaborative decision-making model.

Some embodiments of the present invention utilize an iterative process that not only optimizes a theme based on the digital wardrobes of the participants, but also provides for review and adjustment by the participants, through real-time electronic communications, in order to further tune the theme to align with factors in the digital wardrobes. The consensus building or tuning process is enabled by the real-time communications within a computing environment. In some embodiments of the present invention, the program code: 1) derives participant preferences from digital wardrobes of participants, which the program code utilizes to determine whether a given theme for an event aligns with participant preferences; 2) displays to each of the participants, in real-time, by rendering in graphical user interfaces (GUIs) of computing devices utilized by the participants, for a given preference type, a representation of a proximity of both the participant's own preference and the preferences of other participants, from intersecting as a consensus; 3) solicits and obtains inputs from the each participant, via the computing devices, revising that participant's preference(s), based on the displayed preferences of the other participants, and applies these inputs to narrow the proximities to consensus; and 4) solicits, in the circumstance of no consensus, inputs from participants, enabling the participant to substitute the preference(s) of another participant for the individual's preferences, to move closer to an overall participant consensus for a given preference type. In some embodiments of the present invention, the program code predicts/estimates, based on the consensus preferences, a quantity of compatible participants for a target theme that is selected by the organizers, by applying a threshold to isolate participants with preferences within a given distance of a consensus preference relevant to the theme.

Program code in embodiments of the present invention generates a theme for an event that reflects a consensus among an optimal number of participants. Making this determination provides a number of challenges that are addressed by aspects of embodiments of the present invention. In certain situations, an optimal theme, as generated utilizing the digital wardrobes of the users, may not been the optimized choice, based on other factors, including but not limited to, affordability, originality, weight of preferences, etc. These factors, and others, can provide additional data points that the program code can reference to generate an optimal theme. Additionally, in embodiments of the present invention, rather than utilize the presence of various preferences in digital wardrobes to determine a consensus, for preferences that are not binary, the program code additionally determines the level (e.g., light, moderate, strong) of each preference, when determining whether a consensus exists that should be utilized in generating the theme.

Real world constraints may also limit the possibility of implementing certain themes, including but not limited to, budgetary constraints. In embodiments of the present invention, the program code can consider whether a given theme is feasible, when generating an optimized theme.

In some embodiments of the present invention, the program code may consider preferences in the digital wardrobes of various participants to outweigh those of others. For example, if a goal in generating a theme is to select a unique theme, the program code may identify unique preferences in certain digital wardrobes and determine whether there is a consensus in among the unique preferences.

In some embodiments of the present invention, the program code may also take into account the compatibility of certain preferences, when determining a consensus. Given that the diversity of preferences that the program code derives from the digital wardrobes of the users may be vast, locating a consensus on a given preference may prove difficult (or impossible). In this case, the program code may determine the compatibility of diverse preferences in order to generate a theme that best meets the preferences of the participants, despite not representing a consensus.

Aspects of various embodiments of the present invention are both inextricably tied to computing and provide significantly more than existing technologies, for generating a theme for an event. Embodiments of the present invention are inextricably tied to computing, not only because the program code generates and utilizes the digital wardrobes of individuals to identify preferences and determine a consensus for generating a theme, but also because the program code in these embodiments may also utilize the digital communication channels and the real-time communications, enabled in a distributed computing environment, to facilitate consensus building among the participants, in order to generate an optimal theme. Embodiments of the present invention provide significantly more than existing approaches to event theme generation at least because existing approaches to generating event themes do not automatically select theme for events based on digital wardrobes of participants (e.g., guests, invitees). Some existing approaches rely upon crowd-sourcing a theme, asking participants to vote, through an interface. Aspects of the present invention need not rely on these voting mechanisms because analyzing the digital wardrobes of participants provides these preferences, as well as additional data that the program code can utilize, in embodiments of the present invention, to identify potential themes that would not have been contemplated in advance of this vote solicitation approach. Existing approaches, unlike embodiments of the present invention, also do not provide individual users with data reflecting the proximity of the user's preferences to a possible consensus preference (based on the preference data of the additional participants, extracted from the digital wardrobes of these participants). By utilizing this data, participants may revise their individual preferences to match those of another participant(s), an aspect that is also not available in existing approaches.

FIG. 1 is a technical environment 100 into which aspects of some embodiments of the present invention may be implemented. The aspects of this technical environment are utilized to illustrate how the program code may generate and maintain a digital wardrobe for a user, in some embodiments of the present invention. The resources referenced by the program code in this non-limiting example to generate the digital wardrobe are merely examples of some types of hardware and software that may comprise portions of a user's (i.e., participant's) digital wardrobe. As understood by one of skill in the art, a digital wardrobe of a given user comprises an ascertainable totality of the software and hardware with which the user interacts. Additionally, this technical environment 100 is a non-limiting example of an environment into which aspects of embodiments of the present invention may be implemented.

As will be illustrated in the context of FIG. 1, in embodiments of the present invention, one or more programs generate and maintain a digital wardrobe for a user, which the program code utilizes to generate an optimal theme, for an event in which the user is to be a participant. As will be discussed herein, when tuning a proposed theme, the program code generates the content and displays the content in a user interface 110. The user interface 110 may be rendered by a personal computing device 115 that is paired with one or more Internet of Things (IoT) devices 120.

In addition to viewing content through the user interface 110, displayed/rendered on the personal computing device 115, by program code, executed by a processor internal to the device and/or communicatively coupled to the device over a network (e.g., Internet) connection, the user/viewer may utilize the personal computing device 115 to interact with various computing resources, including the aforementioned IoT devices 120 and social media platforms 125. In some embodiments of the present invention, the user may select and view and interact with content through the user interface 110, as well as transmit and receive data from additional computing resources through the user interface 110.

Based on the connectivity of the personal computing device 115 to the additional computing resources and/or direct connectivity of a computer resource executing the program code to the additional computing resources, program code in embodiments of the present invention may access these additional computing resources (e.g., IoT devices 120 and social media platforms 125) to gather personal information about the user. The program code will utilize this information to generate or update a digital wardrobe of the user. For example, the viewer may utilize a personal computing device 115 to connect to external computing resources (e.g., IoT devices 120 and social media platforms 125) to manage user profiles, configure social media accounts, define preferences, obtain biometrics and other health measurements, etc. The program code in embodiments of the present invention may intercept or observe these communications and/or may take advantage of the connectivity of the personal computing device 115 to these external resources. Based on this connectivity, the program code may obtain data for the digital wardrobe of the user profile, which the program code can store and maintain (e.g., update, based on temporal variations in personal data), in a centralized data store, and/or in a local data store on the user's personal computing device 115.

In some embodiments of the present invention, the program code maintains digital wardrobes in a user database 130 (or more than one user database 130). As discussed herein, program code in an embodiment of the present invention constructs and maintains a digital wardrobe by accessing and analyzing data from one or more computing resources 135, potentially across multiple domains. Data in a digital wardrobe may include, but is not limited to, the likes, dislikes, and all other personal user properties of the user. The program code may also identify various accesses of the user and associate the user with various devices, such that the program code can update the digital wardrobe to include identifiers for the hardware utilized by the user to access various software applications, social media platforms 125, etc.

In embodiments of the present invention, program code executed by at least one processing resource identifies and obtains personal user data from external computing resources, including but not limited to, IoT devices 120 and social media platforms 125. As aforementioned, the interconnectivity of computing resources in the distributed computing environment 100 enables the program code to access data across a variety of systems and platforms and utilize this data to generate and update a digital wardrobe for the user, which the program code can utilize to generate a theme that is temporally in sync with the digital wardrobe. The program code requests, obtains, and stores personal data from the external computing resources.

In some embodiments of the present invention, program code that monitors, collects, and interprets attributes utilized to generate customized themed (i.e., themes customized based on a consensus among participants in an event) can be understood as a digital wardrobe maintenance module. This module may reside on one or more of the personal computing device 115, or a shared computing resource, including but not limited to a resource communicatively coupled to, or hosting, the user database 130. The user database 130 may retain the digital wardrobes of various users. In some embodiments of the present invention, the program code (e.g., the digital wardrobe maintenance module), monitors and learns from social media inputs made on the personal computing device 115 (e.g., when a user utilizes the personal computing device 115 to configure attributes of a social media account on a social media platforms 125). The digital wardrobe for the present invention is effectively linked by this program code to social media accounts on social media platforms 125 and can therefore reflect, in real time, changes to the social media profile that affect generation of optimized themes for events for which the user is anticipated as a participant. By monitoring changes to a social media profile, the program code may extract insights about the user regarding preferences of a user: favorite foods, favorite locations, etc. Similarly, the program code (e.g., the digital wardrobe maintenance module) can monitor and extract insight from a user's utilization of the personal computing device 115 to interact with IoT devices 120, such as personal sensors. By monitoring input through the personal computing device 115 to various personal IoT devices 120, the program code can amass data related to a user's Smart Watch, Smart home system, Google glass, health monitoring system, fitness tracker, etc. The program code can also track what hardware devices a user utilizes to connect to software, including social media platforms 125. The program code utilizes this data to update aspects of the user's digital wardrobe.

Because certain of the data is temporal in nature, by linking the digital wardrobe to the personal sensor data of the user, the digital wardrobe can be consistently updated by the program code to reflect current and accurate data. For example, the program code may access a user's health tracking device to extract health status, over time, and a change in this condition may necessitate a change in preferences regarding an event theme. For example, an uneven heart rate may indicate that a preference for a theme that involves rigorous physical activity should not be weighted heavily by the program code when determining a theme for an event, for which the user is desired as a participant.

In some embodiments of the present invention, in order to obtain timely personal data without impacting the processing efficiency of the computing resources of the technical environment 100, the program code obtains data from one or more external computing resources at pre-defined intervals. The program code may utilize the connectivity of the personal computing device 115 to the external computing resources to crawl these connections at defined intervals or times. The program code obtains both structured and unstructured data and the data obtained from various resources may be in differing formats. Thus, in some embodiments of the present invention, the program code processes the data in order to standardize it for utilization in the digital wardrobe. Depending on the data source, the program code may utilize different methods, processes, and/or algorithms to standardize the data. In some embodiments of the present invention, the program code utilizes natural language processing algorithms and/or cognitive analytics to identify not only user preferences and attributes, but also, to identify a current emotional state or mood of the user (e.g., happy, sad, angry, etc.). In some embodiments of the present invention, the program code may select an emotional state from a pre-defined finite list of possibilities. The program code may apply various analytical tools to data obtained by the program code from the IoT devices 120. In some embodiments of the present invention, the program code consolidates identified attributes into distinct components that the program code retains as specific preferences.

Thus, as explained above, in some embodiments of the present invention, once the program code obtains personalized data, including attributes, from the computing resources communicatively coupled to the personal computing device 115 (e.g., IoT devices 120 and social media platforms 125) the program code utilizes the data to build a digital wardrobe, which the program code may store in a user database 130. In various embodiments of the present invention, the program code utilizes the user database 130 to store the user's digital wardrobe, which includes the user's preferences.

As aforementioned, in some embodiments of the present invention, the program code generates and maintains a digital wardrobe for a user by processing data gathered by the program code based on monitoring a user's software and hardware usage. The program code may utilize cognitive natural language processing 140 executed by a computing resource 135, in order to digest and/or segment the data in a manner that the program code can utilize to identify and weigh preferences to generate a theme based on a consensus. In some embodiments of the present invention, a cognitive natural language processor 140 and the processing capabilities of the program code are implemented as a machine learning system that includes a neural network (NN). In certain embodiments of the present invention the program code utilizes supervised, semi-supervised, or unsupervised deep learning through a single- or multi-layer NN to correlate various attributes from unstructured and structured data related to a user (e.g., gathered by the program code from IoT devices 120 and social media platforms 125) with specific changes to implement in converted-to-text audio content to customize the text for display in a user interface 110 of the user's personal computing device 115. The program code may also utilize resources of the NN to identify and weight data values in the digital wardrobes to classify user attributes as multiple preferences that inform the generation of optimal themes for events.

As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across the distributed network of the technical environment 100. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Thus, by utilizing a NN the program code can identify attributes and classify these attributes into elements of user profiles.

Figure 2:
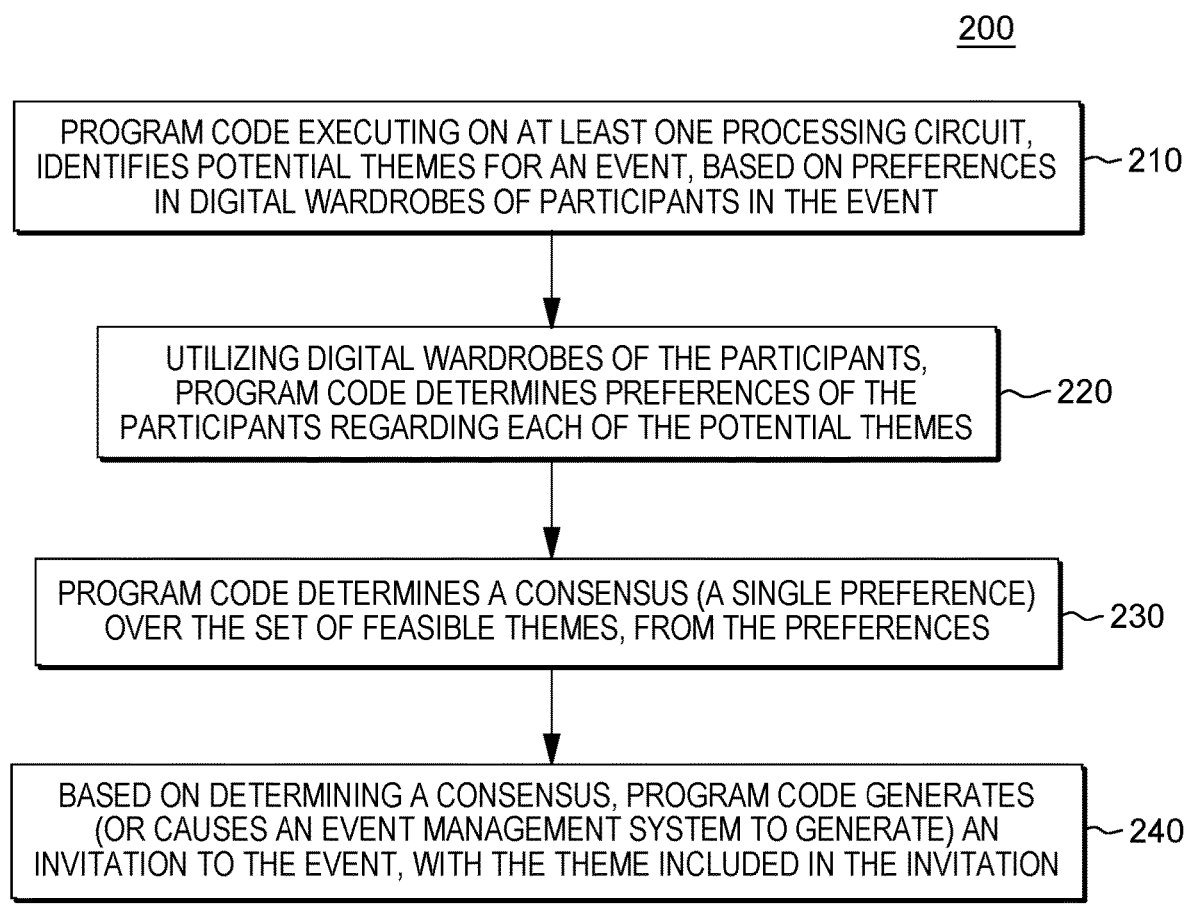
FIG. 2 is a workflow illustrating certain aspects of an embodiment of the present invention.
Figure 3:
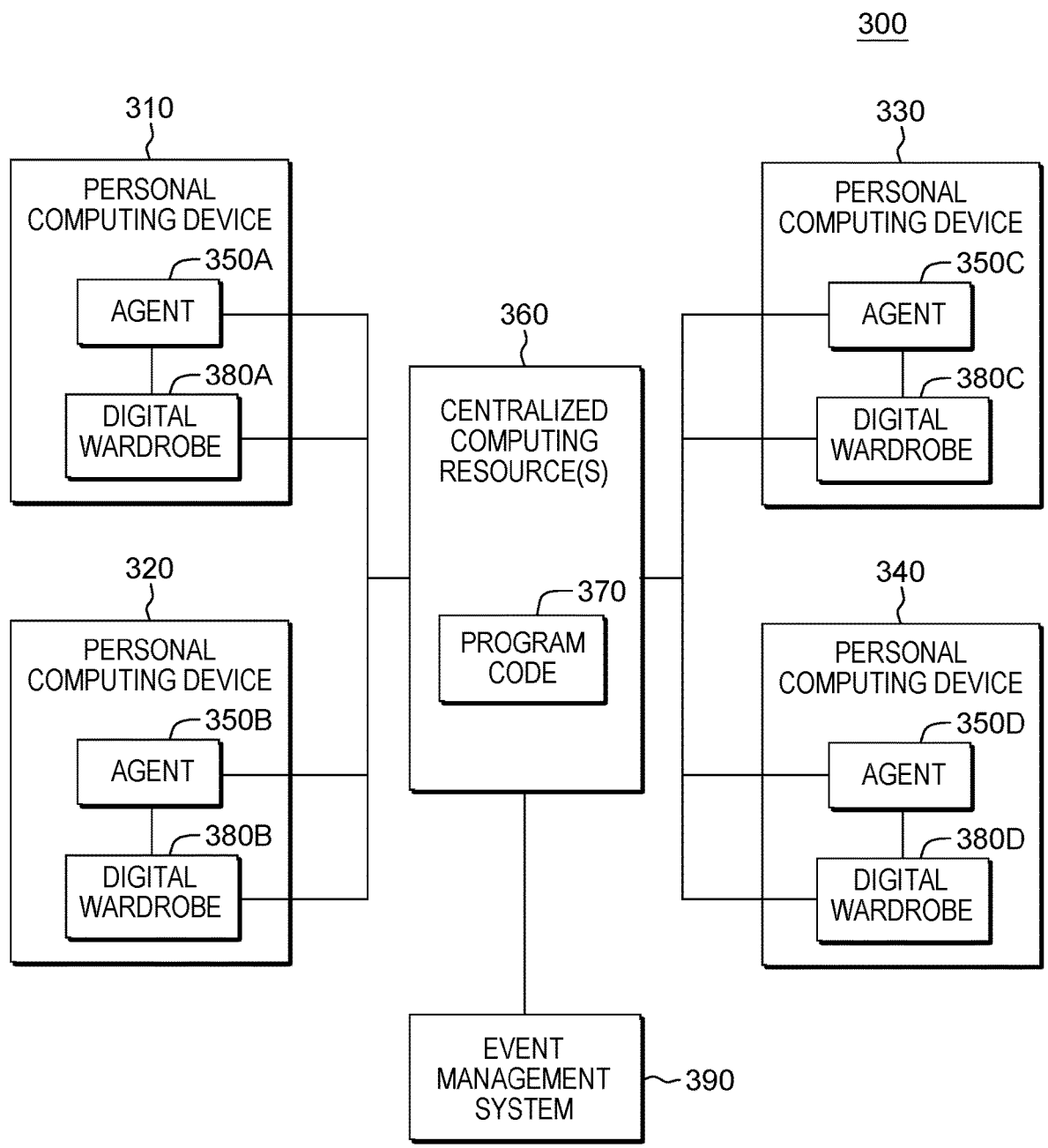
FIG. 3 is an illustration of various aspects of an environment in which aspects of embodiments of the present invention may be implemented.

FIG. 2 is a workflow 200 that provides an overview of various aspects of some embodiments of the present invention, specifically, the consensus building of embodiments of the present invention, utilized by the program code in generating a theme for an event. FIG. 2 is a general workflow that is meant to illustrate certain. As illustrated in FIG. 2, in some embodiments of the present invention, program code executing on at least one processing circuit, identifies potential themes for an event, based on preferences in digital wardrobes of participants in the event (210). Utilizing the digital wardrobes of the participants, the program code determines preferences of the participants regarding each of the potential themes (220). The program code determines a consensus, i.e., a single preference over the set of feasible themes, from the preferences (230). In some embodiments of the present invention, before referencing a digital wardrobe of each participant (210) (220), the program code generates a digital wardrobe, as illustrated in FIG. 1. As illustrated in FIG. 3, the program code determines a consensus from the preferences (230) by enabling communications between participants. In some embodiments of the present invention, based on determining a consensus, the program code generates (or causes an event management system to generate) an invitation to the event, with the theme included in the invitation (240). In some embodiments of the present invention, the program code may automatically send the invitation, electronically, to the participants.

FIG. 3 is a technical environment 300 into which aspects of the present invention may be implemented. This example is non-limiting and utilized to illustrate certain aspects of the present invention. As seen in FIG. 3, each prospective participant (e.g., invitee, confirmed attendee) in an event has a personal computing device 310-340. Four participants are utilized in this example for illustrative purposes, but the number of individual (devices) that comprise the set of participants may vary. Each of the personal computing device 310-340 executes an agent 350a-350d (and/or provides access to an agent executing on one or more shared computing resources). The agents 350a-350d communicate with each other via a centralized computing resource 360, upon which program code 370 that generates, updates, and analyzes digital wardrobes 380a-380d of the participants. In this technical environment 300, the digital wardrobes 380a-380d are retained by the program code 370 on the individual personal computing device 310-340. In some embodiments of the present invention, the agents 350a-350d access the digital wardrobes 380a-380d to provide the program code 370 on the centralized computing resource 360 with preference information. In other embodiments of the present invention, the program code 370 analyzes the digital wardrobes 380a-380d to derive preferences and provides the agents 350a-350d with the preferences to facilitate a consensus, with the involvement of the agents 350a-350d to coordinate between the participants.

The centralized computing resource 360, which can comprise one or more physical machines (as can every resource pictured in FIG. 3), is in communication with an event management system 390, comprising at least one computing resource. The program code 370 executed on the centralized computing resource 360 obtains, from the event management system 390, event-related data, including parameters for various events, including prospective participants (e.g., invitees), timeframes, and other constraints.

In some embodiments of the present invention, the program code 370 obtains a list of possible themes for a given event from the event management system 390. The program code 370 additionally obtains an indication of the prospective participants in the event. In this example, the participants are users associated with personal computing devices 310-340.

The program code 370 identifies the prospective participants and obtains, directly and/or utilizing the agents 350a-

350d, preferences of the participants, relative to each theme in the list of possible themes, based on relevant attributes in the digital wardrobes 380a-380d of the participants. For example, a user of a first personal computing device 310 may have a digital wardrobe 380a that indicates, based on data the program code 370 initially gathered from a social media profile of the user and the user's activity on the first personal computing device 310, that the user has a strong preference for country music. The program code 370 made this determination based on identifying that the user had expressed an interest in country music on social media, streamed country music through a website accessed by the first personal computing device 310, and purchased tickets to multiple country music live performances through an ecommerce website that the user connected to utilizing a browser rendered on the first personal computing device 310. Thus, if the list of possible themes includes a "Country Western" theme for a given event, the program code 370 determines, based on the digital wardrobe of the user, that this user has a strong preference for this theme.

In some embodiments of the present invention, rather than obtain a list of possible themes from the event management system 390, the program code 370 obtains a list of participants. The program code 370 then utilizes the digital wardrobes 380a-380d to generate a list of possible themes, based on determining that the possible themes do not represent a distance from a consensus beyond a threshold value.

Before establishing a consensus from a list of possible themes, whether the list originated from the event management system 390, or is based on the program code 370 analyzing the digital wardrobes 380a-380d of the participants, in some embodiments of the present invention, the program code 370 may encourage or discourage certain results by either eliminating certain possibilities and/or ranking the possibilities in a manner that favors certain outcomes. For example, the program code 370 may obtain, from the event management system 390, for the event, an agenda and/or various established arrangements, and may determine, based on this data, that certain of the themes in the list are more or less feasible than others. The agenda may indicate that the event includes a number of speakers, causing the program code 370 to determine that "Barnyard Theme with Live Petting Zoo," which is among the list of themes, would be disruptive and therefore should not be considered, or should be considered less than other, more practical themes, such as "High Tea Brunch" which is also on the list.

The program code 370 may also adjust the list of themes based on profile information of the participants and the relationships of the participants to the celebrant. For example, the profiles may indicate that a majority of attendees are senior citizens and are in the same madrigal music choir as the celebrant. In this case, the program code 370 may eliminate a theme of "School's Out Rock-n-Roll Beach Party" from the list.

The program code may query the event management system 390, community calendars, and the personal public electronic calendars of the participants to determine past themes for recent events, trending topics, etc. The program code 370 may utilize these attributes to rank certain items of the list higher or lower. For example, the program code 370 may be configured to eliminate themes on the list that are repetitive (have been utilized in events within a given geographic range, within a defined range of time, in advance of the event).

In embodiments of the present invention, in generating a consensus, which is the resultant event theme, the program code 370 generates a quantitative data model represented by: 1) for each user, a private utility representing a distance of an individual participant's preference for a given theme from an aggregated preference, representing the preferences of all the participants, for the given theme; and 2) a public utility representing a distance from consensus of the preferences of all the participants. In some embodiments of the present invention, the agents 350a-350d generate the private and public utilities, in communication with the program code 370. In some embodiments of the present invention, the agents 350a-350d communicate the preferences of the users and the program code 370 determined the private and public utilities for each participant, for each preference.

As explained above, each participant has individual personal preferences over the feasible set of themes (e.g., the list). The set of personal preferences of each of the participants can be represented as {p1, p2, . . . , pn}, which can be understood as ground-truth preferences of the agents 350a-350d. The private utility component for each agent 350a-350d is at a maximum value if the program code 370 and/or agent 350a-350d determines that the participant's preference for a given theme is the consensus outcome. The quantity of this component is reduced based on the distance between the ground-truth preference and the consensus outcome. The public utility component of each agent 350a-350d is at a maximum value when all the agents 350a-350d reach the consensus. The quantity is lower, relative to the maximum value, when the distance of the preferences from indicating a consensus is broader.

In some embodiments of the present invention, the agents 350a-350 and the program code 370 determine the utility values utilizing the utility function denoted as Equation 1 below.

$$U_i(s_1, s_2, \ldots, s_n) = \left\{ \binom{m}{2} - d(s_i, p_i) \right\} + \left\{ \sum_{j,k \in N} Sim(s_j, s_k) \right\} \quad \text{Equation 2}$$

In Equation 3 above, the program code 370 and/or the agents 350a-350d utilize the function d(.,.) to measure the distance (i.e., dissimilarity) between two preferences (i.e., strategies, hence, the user of "s") and the function Sim(.,.) to measure the similarity between two preferences (i.e., strategies). Utilizing the distance calculation to find the difference between two like preferences would result in a value of zero (0). A first portion of the utility function (before the addition), represents a private utility and the second portion represents the public utility. The private utility is a perceived "private payoff," while the second portion is a perceived "public payoff." If the distance between two preferences is 0 (d(pref1, pref2)=0), each pair of feasible solutions has the same ordering in both a first preference (pref1) and a second preference (pref2).

The individual agents 350a-350d and the program code 370, facilitate the program code 370 to generate a consensus (theme for an event). Returning to FIG. 3, in some embodiments of the present invention, the agents 350a-350d include a customized graphical user interface (GUI), which can be rendered in a browser or thin client, which facilitates input from the users, in order to reach a consensus (i.e., generate a theme). Thus, to facilitate a consensus, each agent 350a-350d initially communicates, to the program code 370, a ground truth preference for each prospective theme. If the program code 370 determines, based on receiving this data from the agents 350a-350d, that the participants share a common preference, and therefore, converge to a common theme of the list, the program code 370 selects this common theme as the consensus (i.e., the theme of the event). When the program code 370 determines that the preferences provided by the 350a-350d do not indicate a consensus for any theme, the agents 350a-350d continue to communicate with the program code 370 to reach a consensus, which is illustrated by FIG. 4.

FIG. 3 illustrates what may be reference to as a strategy update rule. In the recitation of this strategy, a "player" refers to program code executing on a computing device (e.g., program code 370 and/or the agents 350a-350d). In considering any arbitrary round r of the game and agent i, with probability 0.5, player i continues to play strategy s_i even in round (i+1). With Probability 0.5, player i does the following: 1) Player i computes the similarity of s_i and s_j where j is any other player; 2) Player i determines the set P all those strategies having the highest similarity with s_i. Player i then selects a strategy s from P that yields the highest utility and plays s in round (i+1).

Figure 4:
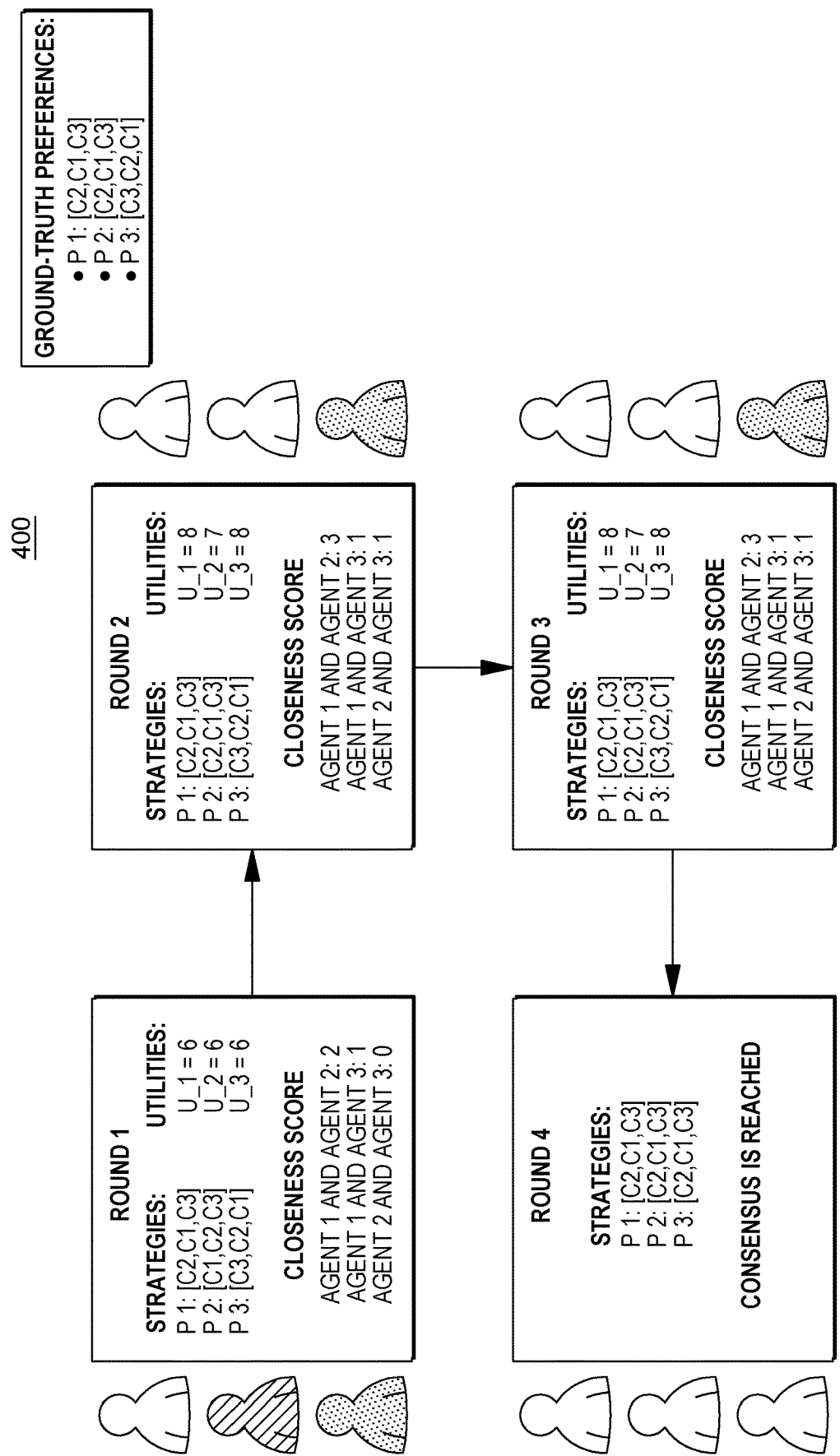
FIG. 4 is a workflow illustrating certain aspects of an embodiment of the present invention.

FIG. 4 is a workflow 400 that illustrates communications between the three of the agents 350a-350c (FIG. 3), who are or are associated with participants in an event, that enable the program code 370 (FIG. 3) to determine a consensus. Initially, based on the ground-truth preferences that the program code 370 (FIG. 3) obtains (e.g., via the agents 350a-350c (FIG. 3)), from the digital wardrobes of the users (e.g., participants), the program code 370 determines that there is no consensus for a theme. There is no consensus because, as illustrated in FIG. 4, the ground-truth preferences of a first participant are [C2,C1,C3], the ground-truth preferences of a second participant are [C1,C2,C3], and the ground-truth preferences of a third participant [C3,C2,C1]. Thus, initially, as illustrated by a Round 1, there is no consensus. The program code 370 (FIG. 3) and/or the agents 350a-350c (FIG. 3) determine the utilities of the participants, which are, respectively, 6, 6, and 6.

The program code 370 (FIG. 3) determines the proximity of the ground-truth preferences to each other, for each combination of participants (agents). When compared with each other, the program code 370 (FIG. 3) determines that the first agent 350a (FIG. 3) and the second agent 350b (FIG. 3) have a closeness score (i.e., a distance) of 2. The program code 370 (FIG. 3) determines that the first agent 350a (FIG. 3) and the third agent 350c (FIG. 3) have a closeness score (i.e., a distance) of 1. The program code 370 (FIG. 3) determines that and the second agent 350b (FIG. 3) and the third agent 350c (FIG. 3) have a closeness score (i.e., a distance) of 0.

Noting no consensus on Round 1, the program code 370 (FIG. 3), utilizing the agents 350a-350c, provide, through the GUIs, the participants with the utility and closeness scores, to enable the users to adjust their preferences to reach a consensus. As seen in Round 2 and Round 3, the second participant and then, the third participant, adjust their preferences in order to enable the program code 370 (FIG. 3) to determine a consensus at Round 4. In some embodiments of the present invention, the agents 350a-350c (FIG. 3) automatically adjust the preferences, in order to reach a consensus. Thus, the adjustments in FIG. 4 are automatic and performed without any user interaction. In some embodiments of the present invention, in order to reach a consensus, a participant, manually or automatically, will substitute the preferences of another participant/agent for the participant's/agent's own preferences, in order to generate a consensus.

Figure 5:
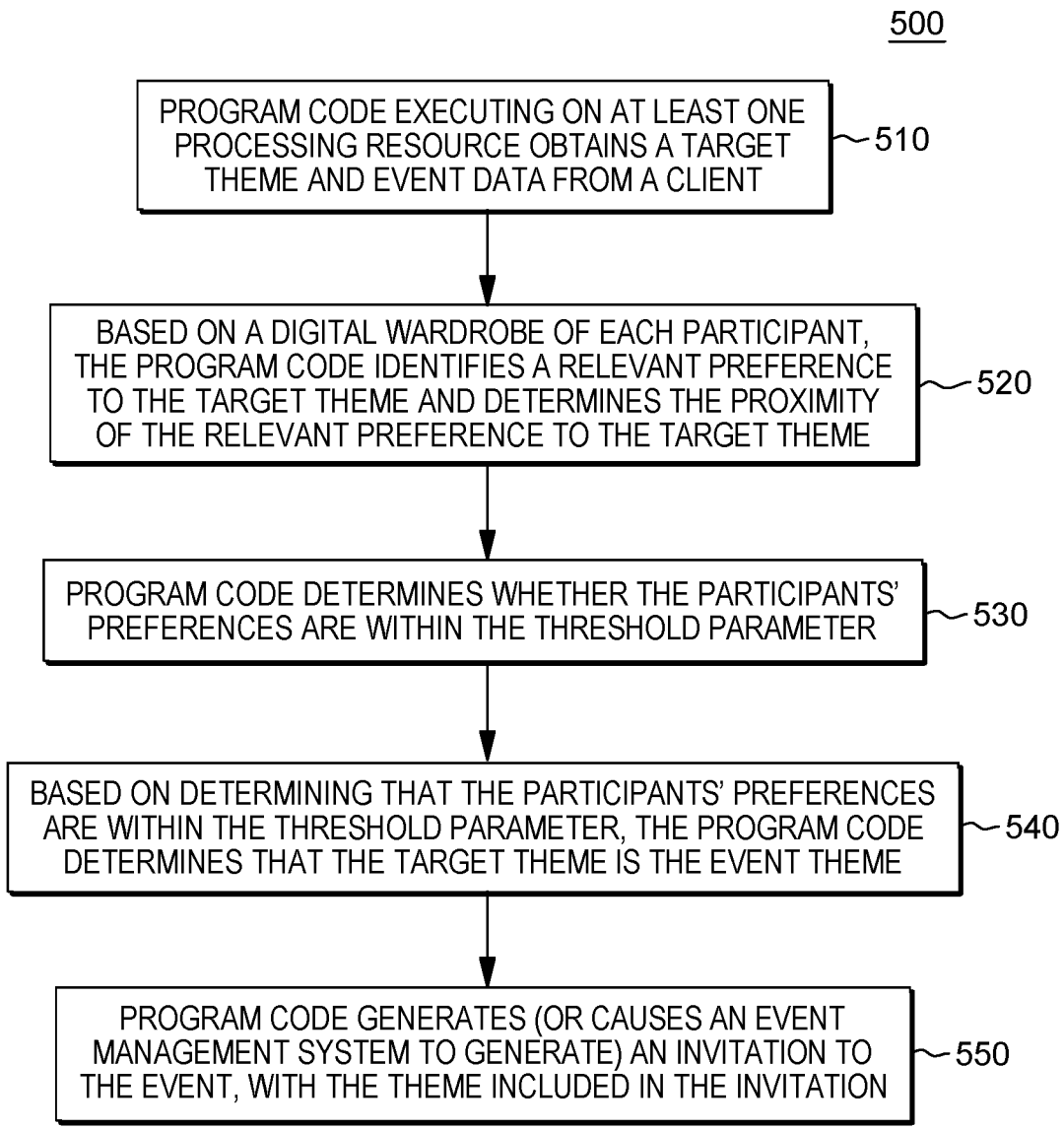
FIG. 5 is a workflow illustrating certain aspects of an embodiment of the present invention.

FIGS. 2-4 illustrate embodiments of the present invention where a list of possible themes is either supplied to the program code from an event management system, or, based on the program code generating the list from the digital wardrobes of prospective participants in an event. However, in some embodiments of the present invention, the program code utilizes the digital wardrobes of a set of participants to generate a theme, that rather than being a theme for which a consensus has been established, as illustrated in FIG. 4, the theme is based on proximity of the preferences of a threshold number of users to a pre-determined target theme. FIG. 5 is a workflow 500 that illustrates embodiments of the present invention where a target theme for an event is accepted or rejected, by the program code, based on analyzing the digital wardrobes of the prospective participants.

Turning to FIG. 5, in some embodiments of the present invention, program code executing on at least one processing resource obtains a target theme and event data from a client (510). The client may be a node of an event management system. The event data includes participants for the event, a target theme for the event, and a threshold parameter representing an acceptable threshold for proximity to a parameter for a preference of a given participant. Based on a digital wardrobe of each participant, the program code identifies a relevant preference to the target theme and determines the proximity of the relevant preference to the target theme (520). The program code determines whether the participants' preferences are within the threshold parameter (530). Based on determining that the participants' preferences are within the threshold parameter, the program code determines that the target theme is the event theme (540). In some embodiments of the present invention, upon determining the theme, the program code generates (or causes an event management system to generate) an invitation to the event, with the theme included in the invitation (550). In some embodiments of the present invention, the program code may automatically send the invitation, electronically, to the participants. In some embodiments of the present invention, the program code may obtain a threshold percentage of participants whose preferences must be within the threshold parameter for the program code to determine that that the target theme is the event theme. In these embodiments, all the participants need not have preferences within the threshold range for the program code to determine that the target theme is the event theme.

Embodiments of the present invention include a computer-implemented method, a computer program product, and a computer system, where program code, executed by one or more processors, generates a digital wardrobe for each user of a set of users. The generating includes, for each user, the program code monitoring user activity on one or more computing nodes to identify structured and unstructured data sources storing data related to the user, where the activity on the one or more computing nodes comprises connecting to the structured and unstructured data sources and to identify the one or more computing nodes utilized by the user, the program code machine learning, by the one or more processors, attributes of the user, based on ingesting structured data and unstructured data from the data sources and the identity of the one or more computing nodes utilized by the user, and the program code determining that a portion of the attributes represent preferences relevant to particular event themes. The program code obtains one or more prospective themes for a given event and a list of participants comprising a portion of the set of users. The program code identifies one or more preferences, in the digital wardrobes of the portion of the set of users, relevant to each of the one or more prospective themes for the given event. The program code determines, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, where the respective one or more relevant preferences for the given prospective theme are aligned across the portion of the set of users. Based on determining that the consensus exists, the program code generates an event theme for the given event, wherein the event theme is the consensus.

In some embodiments of the present invention, the program code, based on determining that a consensus does not exist, determines, for each user of the portion of the set of users, for each of the one or more prospective theme, a distance between the one or more relevant preferences of the user and the one or more relevant preferences of remaining users of the portion of the set of users who are not the user, where the distance is a quantitative measure of preference similarity. The program code automatically notifies the portion of the set of users, via a dynamic custom graphical user interface on a client utilized by each user in the portion of the set of users, of the distances. The program code adjusts the respective one or more relevant preferences for the given prospective theme for one or more users of the portion of the set of users to align the respective one or more relevant preferences of the portion to establish the consensus.

In some embodiments of the present invention, when the program code adjusts the respective one or more relevant preferences for the given prospective theme for the one or more users, the program code provides, via the dynamic custom graphical user interface, each user with the distances. The program code obtains a change in the one or more preferences from at least one user. The program code determines, based on applying the change to the one or more relevant preferences in the digital wardrobes of the portion of the set of users, if the consensus exists. The program code may also, based on determining that a consensus does not exist, update, based on the change, the distances. The program may additionally provide, via the dynamic custom graphical user interface, each user with the updated distances. Also, the program code may obtain another change in the one or more preferences from at least one user and determine, based on applying the other change to the one or more relevant preferences in the digital wardrobes of the portion of the set of users, if the consensus exists.

In some embodiments of the present invention, when the program code adjusts the respective one or more relevant preferences for the given prospective theme for the one or more users, the program code automatically implements a change in the one or more preferences from at least one user, wherein the implementing the change generates the consensus, and based on determining that the consensus exists, the program code generates an event theme for the given event, wherein the event theme is the consensus.

In some embodiments of the present invention, the program code obtaining the one or more prospective themes includes: the program code analyzing, by the one or more processors, the digital wardrobes of the portion of the set of users, the program code identifying one or more specific preferences common to a pre-determined quantity of the digital wardrobes of the portion of the set of users, and the program code generating the one or more prospective themes based on the specific preferences.

In some embodiments of the present invention, the program code obtaining the one or more prospective themes includes: the program code obtaining, from an event management system communicatively coupled to the one or more processors, the one or more prospective themes.

In some embodiments of the present invention, the program code updates an event record in the event management system, for the event, with the theme.

In some embodiments of the present invention, the program code transmits electronic invitations to the event to the portion of the set of users, wherein the electronic invitations include the theme.

In some embodiments of the present invention, based on determining that the consensus does not exist, the program code determines if the distances for a pre-defined number of the portion of users are within a pre-determined threshold for a prospective theme of the one or more prospective themes. Based on determining that the distances for the pre-defined number of the portion of users are within the pre-determined threshold for the prospective theme, the program code generates the event theme for the given event, where the event theme is the prospective theme.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the personal computing devices 115 (FIG. 1), the Internet of Things (IoT) devices 120 (FIG. 1), the user database 130 (FIG. 1), and one or more computing resources 135 (FIG. 1) can each be understood as a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
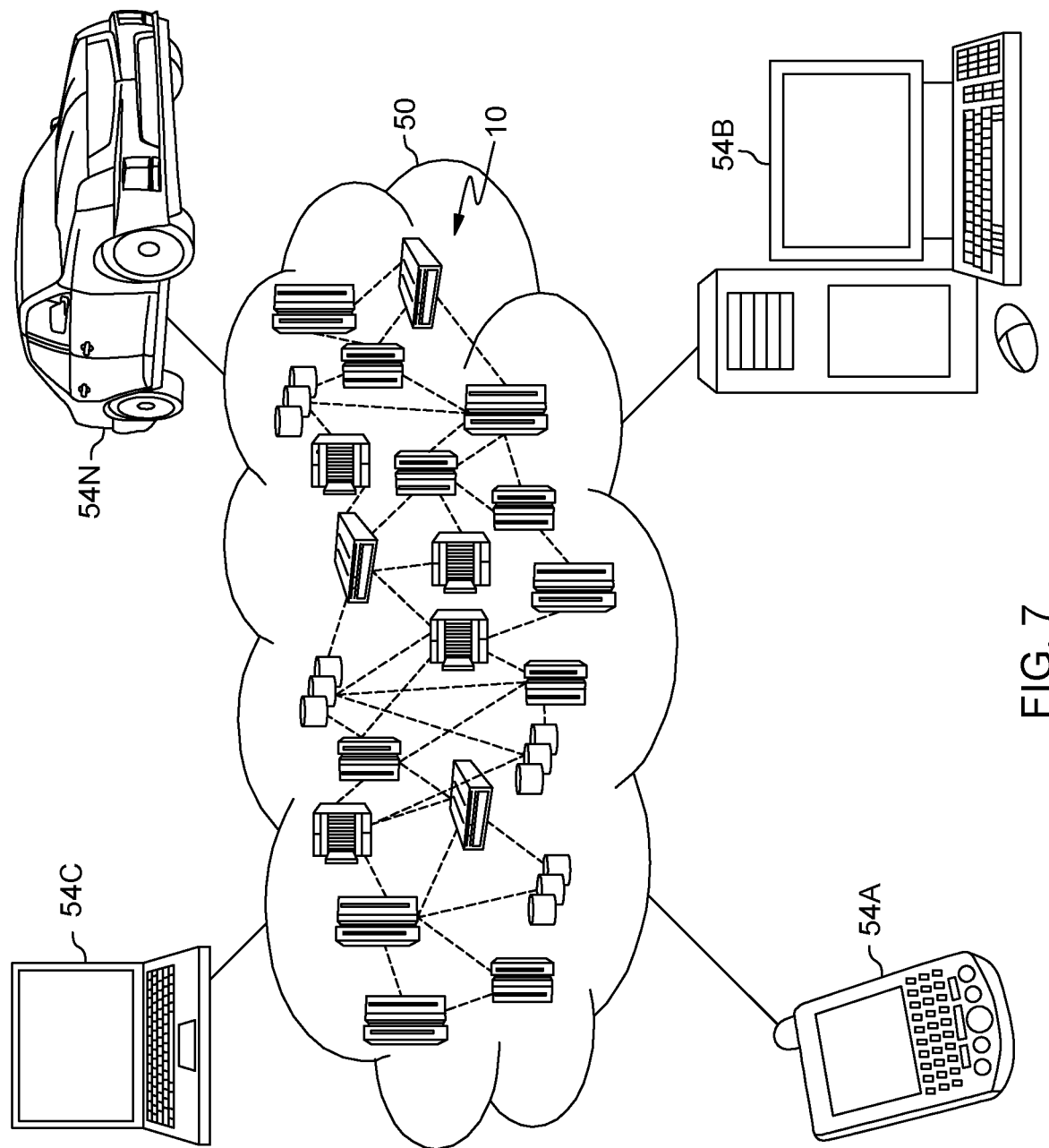
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
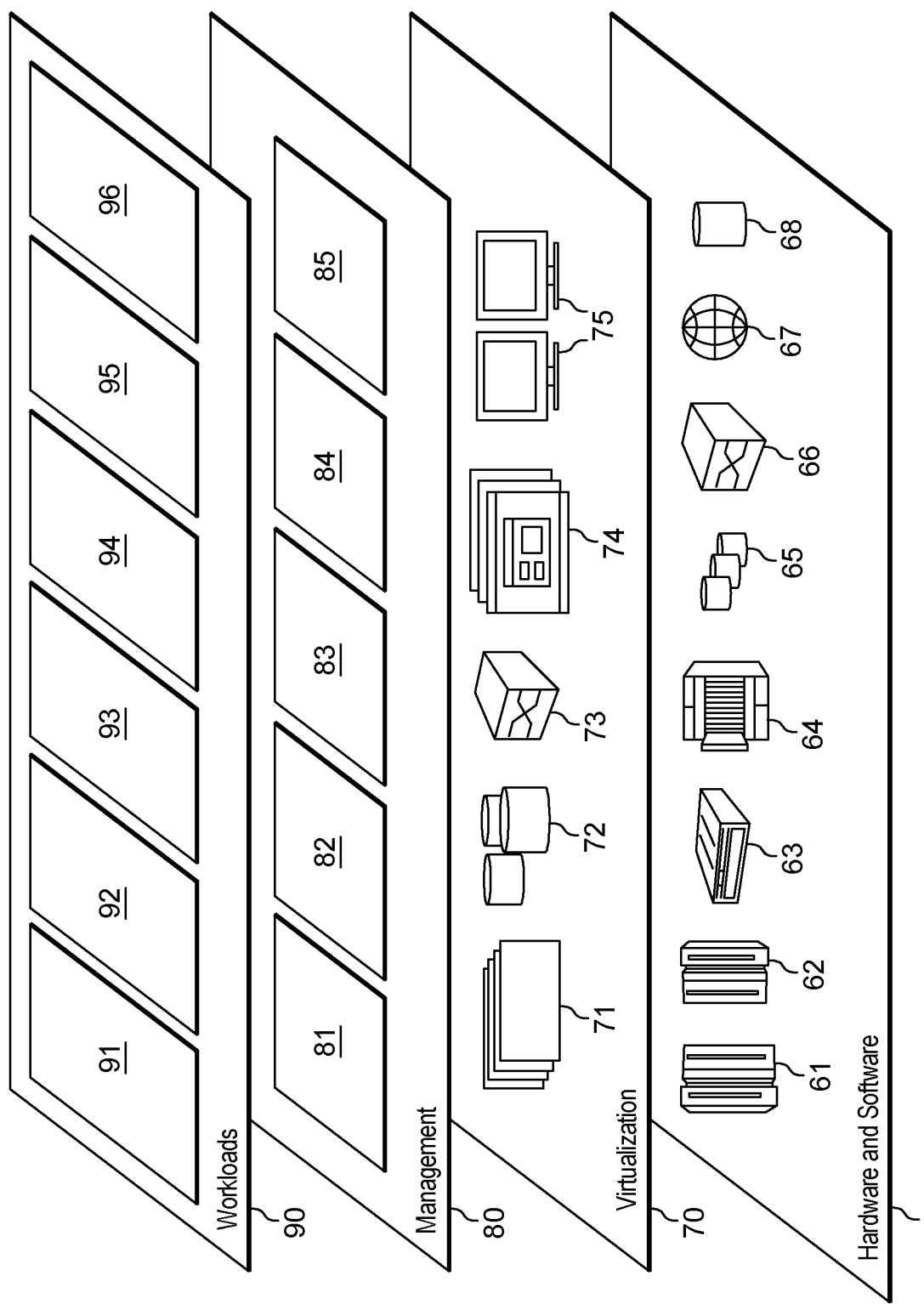
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a cognitive multiple factor analysis to generate an event theme 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   automatically generating, by one or more processors, as a background process and without soliciting data entry from each user of a set of users, a digital wardrobe for each user of the set of users, wherein the digital wardrobe for each user is a unique digital identifier for each user, wherein the unique identifier for each user comprises a record of all hardware and software that the user interacts with, the generating comprising, for each user:
   monitoring, by the one or more processors user activity on one or more computing nodes to identify structured data sources and unstructured data sources storing data related to the user, wherein the activity on the one or more computing nodes comprises connecting to the structured data sources and the unstructured data sources accessed by the user via the one or more computing nodes and to identify the one or more computing nodes utilized by the user, wherein the one or more computing nodes utilized by the user comprise or are communicatively coupled to hardware that the user interacts with, and the one or more computing nodes execute or provide access to software that the user interacts with;

installing, by the one or more processors, on each computing node of one or more computing nodes utilized by the user, an agent, wherein the agent connects to the structured data sources and the unstructured data sources, via each computing node, and wherein the agent generates, maintains, and updates the digital wardrobe for the user on each computing node of one or more computing nodes utilized by the user, based in the user activity;

automatically machine learning, by the one or more processors, via executing the installed agent on each computing node utilized by the user, based on the digital wardrobe of the user, attributes of the user, wherein the machine learning comprises utilizing cognitive natural language processing to ingest structured data and unstructured data from the data sources and the identity of the one or more computing nodes utilized by the user, wherein the machine learning further comprises continuously updating the attributes of the user based on temporal variations in the structured data and the unstructured data from the data sources including utilizing the natural language processing to identify a current emotional state or mood of the user from a pre-defined finite list of possibilities, wherein the possibilities comprise happy, sad, and angry, wherein the automatically machine learning comprises utilizing a neural network, wherein the automatically machine learning utilizes the neural network to classify the attributes of the user as multiple preferences that inform the generation of optimal themes for events for the user, wherein the machine learning further comprises correlating the attributes of the user from the unstructured data and the structured data related to the user with changes to implement in converted-to-text audio content to customize text for display in a customized user interface in accordance with at least one of the optimal themes for events for the user;

determining, by the one or more processors, that a portion of the attributes represent preferences relevant to particular event themes;

obtaining, by the one or more processors, one or more prospective themes for a given event and a list of participants comprising a portion of the set of users;

identifying, by the one or more processors, one or more preferences, in the digital wardrobes of the portion of the set of users, relevant to each of the one or more prospective themes for the given event;

determining, by the one or more processors, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, wherein the respective one or more relevant preferences for the given prospective theme are aligned across the portion of the set of users;

based on determining that the consensus does not exist, determining, by the one or more processors, a private utility and a public utility for each preference, wherein the private utility represents a distance of an individual user's preference for a given theme from an aggregated preference, representing preferences of all the users, for the given theme and the public utility represents a distance from consensus of the preferences of all the users;

automatically notifying, by the one or more processors, each user of the portion of the set of users, via a dynamic custom graphical user interface on a client utilized by each user in the portion of the set of users, of the private utility and the public utility, in real-time, wherein the automatically notifying comprises displaying, in the dynamic custom graphical interface;

automatically adjusting, by the one or more processors, a respective one or more relevant preferences for the given prospective theme for one or more users of a portion of the users to align the respective one or more relevant preferences of the portion to establish the consensus, wherein the automatically adjusting comprises substituting preferences of a first user for a second user to establish the consensus, wherein the event theme is the consensus; and transmitting, by the one or more processors, electronic invitations to the event to the portion of the set of users, wherein the electronic invitations include the theme.

2. The computer-implemented method of claim 1, the obtaining the one or more prospective themes comprising:
analyzing, by the one or more processors, the digital wardrobes of the portion of the set of users;
identifying, by the one or more processors, one or more specific preferences common to a pre-determined quantity of the digital wardrobes of the portion of the set of users; and
generating, by the one or more processors, the one or more prospective themes based on the specific preferences.

3. The computer-implemented portion of claim 1, the obtaining the one or more prospective themes comprising:
obtaining, from an event management system communicatively coupled to the one or more processors, the one or more prospective themes.

4. The computer-implemented portion of claim 3, further comprising:
updating, by the one or more processors, an event record in the event management system, for the event, with the theme.

5. The computer-implemented method of claim 1, wherein the automatically machine-learning utilizes techniques selected from the group consisting of: supervised, semi-supervised, and unsupervised deep learning through the neural network to correlate the attributes with the changes.

6. The computer-implemented method of claim 1, wherein the possibilities consist of happy, sad, and angry.

7. A computer program product comprising:
a non-transitory computer readable storage medium readable by one or more processors and storing instructions for execution by the one or more processors for performing a method comprising:

automatically generating, by the one or more processors, as a background process and without soliciting data entry from each user of a set of users, a digital wardrobe for each user of the set of users, wherein the digital wardrobe for each user is a unique digital identifier for each user, wherein the unique identifier for each user comprises a record of all hardware and software that the user interacts with, the generating comprising, for each user:
  monitoring, by the one or more processors user activity on one or more computing nodes to identify structured data sources and unstructured data sources storing data related to the user, wherein the activity on the one or more computing nodes comprises connecting to the structured data sources and the unstructured data sources accessed by the user via the one or more computing nodes and to identify the one or more computing nodes utilized by the user, wherein the one or more computing nodes utilized by the user comprise or are communicatively coupled to hardware that the user interacts with, and the one or more computing nodes execute or provide access to software that the user interacts with;
  installing, by the one or more processors, on each computing node of one or more computing nodes utilized by the user, an agent, wherein the agent connects to the structured data sources and the unstructured data sources, via each computing node, and wherein the agent generates, maintains, and updates the digital wardrobe for the user on each computing node of one or more computing nodes utilized by the user, based in the user activity;
  automatically machine learning, by the one or more processors, via executing the installed agent on each computing node utilized by the user, based on the digital wardrobe of the user, attributes of the user, wherein the machine learning comprises utilizing cognitive natural language processing to ingest structured data and unstructured data from the data sources and the identity of the one or more computing nodes utilized by the user, wherein the machine learning further comprises continuously updating the attributes of the user based on temporal variations in the structured data and the unstructured data from the data sources including utilizing the natural language processing to identify a current emotional state or mood of the user from a pre-defined finite list of possibilities, wherein the possibilities comprise happy, sad, and angry, wherein the automatically machine learning comprises utilizing a neural network, wherein the automatically machine learning utilizes the neural network to classify the attributes of the user as multiple preferences that inform the generation of optimal themes for events for the user, wherein the machine learning further comprises correlating the attributes of the user from the unstructured data and the structured data related to the user with changes to implement in converted-to-text audio content to customize text for display in a customized user interface in accordance with at least one of the optimal themes for events for the user;
  determining, by the one or more processors, that a portion of the attributes represent preferences relevant to particular event themes;
  obtaining, by the one or more processors, one or more prospective themes for a given event and a list of participants comprising a portion of the set of users;
  identifying, by the one or more processors, one or more preferences, in the digital wardrobes of the portion of the set of users, relevant to each of the one or more prospective themes for the given event;
  determining, by the one or more processors, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, wherein the respective one or more relevant preferences for the given prospective theme are aligned across the portion of the set of users;
  based on determining that the consensus does not exist, determining, by the one or more processors, a private utility and a public utility for each preference, wherein the private utility represents a distance of an individual user's preference for a given theme from an aggregated preference, representing preferences of all the users, for the given theme and the public utility represents a distance from consensus of the preferences of all the users;
  automatically notifying, by the one or more processors, each user of the portion of the set of users, via a dynamic custom graphical user interface on a client utilized by each user in the portion of the set of users, of the private utility and the public utility, in real-time, wherein the automatically notifying comprises displaying, in the dynamic custom graphical interface;
  automatically adjusting, by the one or more processors, a respective one or more relevant preferences for the given prospective theme for one or more users of a portion of the users to align the respective one or more relevant preferences of the portion to establish the consensus, wherein the automatically adjusting comprises substituting preferences of a first user for a second user to establish the consensus, wherein the event theme is the consensus; and
  transmitting, by the one or more processors, electronic invitations to the event to the portion of the set of users, wherein the electronic invitations include the theme.

8. The computer program product of claim 7, the obtaining the one or more prospective themes comprising:
  analyzing, by the one or more processors, the digital wardrobes of the portion of the set of users;
  identifying, by the one or more processors, one or more specific preferences common to a pre-determined quantity of the digital wardrobes of the portion of the set of users; and
  generating, by the one or more processors, the one or more prospective themes based on the specific preferences.

9. The computer program product of claim 7, the obtaining the one or more prospective themes comprising:
  obtaining, from an event management system communicatively coupled to the one or more processors, the one or more prospective themes; and updating, by the one or more processors, an event record in the event management system, for the event, with the theme.

10. A system comprising:
a memory;
one or more processors in communication with the memory;
program instructions executable by the one or more processors via the memory to perform a method, the method comprising:
   automatically generating, by the one or more processors, as a background process and without soliciting data entry from each user of a set of users, a digital wardrobe for each user of the set of users, wherein the digital wardrobe for each user is a unique digital identifier for each user, wherein the unique identifier for each user comprises a record of all hardware and software that the user interacts with, the generating comprising, for each user:
      monitoring, by the one or more processors user activity on one or more computing nodes to identify structured data sources and unstructured data sources storing data related to the user, wherein the activity on the one or more computing nodes comprises connecting to the structured data sources and the unstructured data sources accessed by the user via the one or more computing nodes and to identify the one or more computing nodes utilized by the user, wherein the one or more computing nodes utilized by the user comprise or are communicatively coupled to hardware that the user interacts with, and the one or more computing nodes execute or provide access to software that the user interacts with;
      installing, by the one or more processors, on each computing node of one or more computing nodes utilized by the user, an agent, wherein the agent connects to the structured data sources and the unstructured data sources, via each computing node, and wherein the agent generates, maintains, and updates the digital wardrobe for the user on each computing node of one or more computing nodes utilized by the user, based in the user activity;
      automatically machine learning, by the one or more processors, via executing the installed agent on each computing node utilized by the user, based on the digital wardrobe of the user, attributes of the user, wherein the machine learning comprises utilizing cognitive natural language processing to ingest structured data and unstructured data from the data sources and the identity of the one or more computing nodes utilized by the user, wherein the machine learning further comprises continuously updating the attributes of the user based on temporal variations in the structured data and the unstructured data from the data sources including utilizing the natural language processing to identify a current emotional state or mood of the user from a pre-defined finite list of possibilities, wherein the possibilities comprise happy, sad, and angry, wherein the automatically machine learning comprises utilizing a neural network, wherein the automatically machine learning utilizes the neural network to classify the attributes of the user as multiple preferences that inform the generation of optimal themes for events for the user, wherein the machine learning further comprises correlating the attributes of the user from the unstructured data and the structured data related to the user with changes to implement in converted-to-text audio content to customize text for display in a customized user interface in accordance with at least one of the optimal themes for events for the user;
   determining, by the one or more processors, that a portion of the attributes represent preferences relevant to particular event themes;
   obtaining, by the one or more processors, one or more prospective themes for a given event and a list of participants comprising a portion of the set of users;
   identifying, by the one or more processors, one or more preferences, in the digital wardrobes of the portion of the set of users, relevant to each of the one or more prospective themes for the given event;
   determining, by the one or more processors, based on analyzing the one or more relevant preferences in the digital wardrobes of the portion of the set of users, if a consensus exists in the one or more relevant preferences of the portion of the set of users, wherein the consensus represents a given prospective theme of the one or more prospective themes, wherein the respective one or more relevant preferences for the given prospective theme are aligned across the portion of the set of users;
   based on determining that the consensus does not exist, determining, by the one or more processors, a private utility and a public utility for each preference, wherein the private utility represents a distance of an individual user's preference for a given theme from an aggregated preference, representing preferences of all the users, for the given theme and the public utility represents a distance from consensus of the preferences of all the users;
   automatically notifying, by the one or more processors, each user of the portion of the set of users, via a dynamic custom graphical user interface on a client utilized by each user in the portion of the set of users, of the private utility and the public utility, in real-time, wherein the automatically notifying comprises displaying, in the dynamic custom graphical interface;
   automatically adjusting, by the one or more processors, a respective one or more relevant preferences for the given prospective theme for one or more users of a portion of the users to align the respective one or more relevant preferences of the portion to establish the consensus, wherein the automatically adjusting comprises substituting preferences of a first user for a second user to establish the consensus, wherein the event theme is the consensus; and
   transmitting, by the one or more processors, electronic invitations to the event to the portion of the set of users, wherein the electronic invitations include the theme.

* * * * *